United States Patent [19]

Brandenburger

[11] Patent Number: 5,798,013

[45] Date of Patent: Aug. 25, 1998

[54] METHOD AND APPARATUS FOR PRODUCING A TUBULAR LINING HOSE

[75] Inventor: Joachim Brandenburger, Garmisch-Partenkirchen, Germany

[73] Assignee: Brandenburger Patentverwertungsgesellschaft des burgerlichen Rechts, Garmisch-Partenkirchen, Germany

[21] Appl. No.: 596,148

[22] PCT Filed: Jul. 29, 1994

[86] PCT No.: PCT/EP94/02521

§ 371 Date: May 24, 1996

§ 102(e) Date: May 24, 1996

[87] PCT Pub. No.: WO95/04646

PCT Pub. Date: Feb. 16, 1995

[30] Foreign Application Priority Data

Aug. 6, 1993 [DE] Germany .............. 43 26 503.0
Nov. 22, 1993 [DE] Germany .............. 43 39 756.5

[51] Int. Cl.⁶ .............. F16L 55/165; B65H 81/00
[52] U.S. Cl. .............. 156/188; 156/190; 156/195; 156/217; 156/294; 156/425; 156/428; 156/432; 156/446; 156/465
[58] Field of Search .............. 156/188, 190, 156/195, 294, 272.2, 275.5, 425, 428–430, 432, 446, 465, 466, 217, 218

[56] References Cited

U.S. PATENT DOCUMENTS

| | | |
|---|---|---|
| 2,256,263 | 9/1941 | Haycock . |
| 2,491,152 | 12/1949 | Beidle . |
| 3,855,031 | 12/1974 | McNeely et al. . |
| 3,874,970 | 4/1975 | Dunn . |
| 3,915,618 | 10/1975 | Feucht et al. . |
| 4,009,063 | 2/1977 | Wood .............. 156/294 X |
| 4,113,546 | 9/1978 | Anders .............. 156/195 X |
| 4,581,247 | 4/1986 | Wood .............. 156/272.2 X |
| 4,680,066 | 7/1987 | Wood .............. 156/275.5 X |
| 4,687,677 | 8/1987 | Jonasson .............. 156/272.2 X |

FOREIGN PATENT DOCUMENTS

| | | |
|---|---|---|
| 0536720 | 4/1995 | Belgium . |
| 0292703 | 11/1988 | European Pat. Off. . |
| 0347364 | 12/1989 | European Pat. Off. . |
| 2218180 | 10/1974 | France .............. 156/195 |
| 2683889 | 6/1993 | France . |
| 2444507 | 4/1976 | Germany . |
| 2849679 | 5/1980 | Germany . |
| 3421364 | 12/1985 | Germany . |
| 2002485 | 2/1979 | United Kingdom . |
| 2104615 | 3/1983 | United Kingdom . |
| 8704226 | 7/1987 | WIPO .............. 156/287 |
| 9011175 | 10/1990 | WIPO . |
| 9114896 | 10/1991 | WIPO . |

*Primary Examiner*—Jeff H. Aftergut
*Attorney, Agent, or Firm*—Richardson & Folise

[57] ABSTRACT

The present invention refers to a method of producing a tubular lining hose, in particular for use in sewer reconstruction work, comprising the steps of forming at least one fibrous strip into a curable, resin-impreganted hose. The inner side of the resultant lining hose is provided with a protective foil. It is the object of the present invention to provide a method of producing a tubular lining hose with the aid of which hoses of arbitrary length can be produced in a simple manner. This object is achieved by producing first a foil hose, which forms the protective foil, by helically winding a foil strip onto a winding mandrel, the fibrous strip being then wound onto said foil hose. In addition, the present invention refers to apparatuses for carrying out said method as well as to the lining hose itself.

29 Claims, 9 Drawing Sheets

METHOD AND APPARATUS FOR PRODUCING A TUBULAR LINING HOSE

The present invention refers to a method of producing a tubular lining hose, in particular for use in sewer reconstruction work, comprising the steps of forming a fibrous strip into a curable, resin-impreganted hose, the inner side of the resultant lining hose being provided with a protective foil. The present invention additionally refers to an apparatus for carrying out the method according to the present invention as well as to a lining hose produced by means of this method.

German-Offenlegungsschrift 3922351 describes a winding tube seated on a protective foil, which surrounds a heating jacket, during the heat-curing process; in the case of said winding tube, the winding ends of the fibrous strip and, consequently, also the overlapping edge extend helically over the length of the winding tube. Such lining hoses are preferably introduced in defective waste pipes where they are then brought into contact with the inner surface of the damaged waste pipe by means of an expansion process. The expansion of the lining hose can be achieved by applying an internal pressure by means of air or water. In the course of this process, the overlapping areas slide on one another. When the lining hose has been expanded in the waste pipe, said lining hose, which is impreganted with resin, is cured. The type of curing depends on the resin which has been used. UV-curable and heat-curable resins proved to be particularly useful.

It is the object of the present invention to provide a method of producing a tubular lining hose of the type mentioned at the beginning with the aid of which hoses of arbitrary length can be produced in a simple manner.

In accordance with the present invention, this object is achieved by producing first a foil hose, which forms the protective foil, by helically winding a foil strip onto a winding mandrel, the fibrous strip being then wound onto said foil hose. Due to the fact that, as suggested by the method according to the present invention, arbitrary lengths of the foil hose can be produced, lining hoses for waste pipes of arbitrary dimensions can be produced, if desired also in situ, without major resetting operations and without great expenditure of work. For the sake of completeness, reference is at this point also made to the fact that, independently of the respective embodiment, the lining hose produced by this method can be expanded and cured also without having been brought into contact with a waste pipe; in this case, said lining hose can then be used as a substitute for a piping, e.g. a water pipe, a pipeline or a waste pipe.

In accordance with a preferred embodiment, the lining hose is provided with an outer foil hose which prevents possibly harmful constituents of the resin from being transferred to the environment through leakage points in the waste pipe. For this purpose, the fibrous strip formed into a hose can have applied thereto an outer foil hose by helically winding a second foil strip onto said fibrous strip, the associated lateral edges of said second foil strip being preferably arranged such that they overlap.

The lining hose can especially be produced at a comparatively high speed, when the the winding operations of the fibrous strip and of the foil strip or of the foil strips are carried out essentially simultaneously.

In accordance with an advantageous embodiment, the overlapping lateral edges of the first or second foil strip are sealingly interconnected preferably by welding or by means of an adhesive. This prevents possibly harmful constituents of the resin from being transferred to the environment.

The leakproofness and the robustness, e.g. with regard to the introduction in a sewer section, can be improved still further in the case of an embodiment where the overlapping lateral edges of the first and/or second foil strip(s) are sealingly interconnected, preferably by welding or by means of an adhesive.

A particularly simple possibility of interconnecting the edges of the inner and/or outer foil hose(s) is an adhesive tape unwound in the same direction. The adhesive tape can then selectively be applied to the inner or outer sides of the foil hoses. This course of action proved to be particularly economy-priced because the more complicated welding and adhesive supply means can be dispensed with.

In accordance with an additional embodiment, the fibrous strip can be wound helically around the foil hose such that a hose shape is obtained, the lateral edges of the fibrous strip, which face each other, being arranged in an overlapping mode of arrangement. The wound structure has the advantage that the thickness of the lining hose can be determined by the winding lead.

In order to prevent one seam from being wound on top of another seam, it will be advantageous to wind the fibrous strip such that the lead obtained is opposite to the lead of the first or second foil strip. An advantageous structure of the hose can be obtained by winding at least two fibrous strips crosswise with respect to one another.

According to an additional preferred embodiment, the fibrous strips can be wound onto the hoselike protective foil such that their longitudinal edges are oriented essentially in the longitudinal direction of the hose, said fibrous strips being guided with the aid of guide means round the protective foil such that the shape of a hose is obtained, and the seams and/or overlaps of two longitudinal edges of a fibrous strip or of two fibrous strips being covered by a superimposed fibrous strip. This permits the production of a lining hose of arbitrary length and wall thickness with comparatively little expenditure as far as the devices used in the production of said hose are concerned. The fact that the seams and/or overlaps are covered by a superimposed fibrous strip guarantees a high stability and tearing strength of the lining hose. At this point, it should be mentioned that an embodiment in the case of which the seams and/or overlaps of the outermost layer are no longer covered still is within the scope of the present invention. This course of action will not only reduce the expenditure of work still further but it will also permit higher speeds in the lining hose production process.

In order to obtain a particularly high strength of the lining hose, the fibrous strips are unwound in a condition in which they are displaced relative to one another in such a way that the seams and/or the overlaps of the longitudinal edges will be arranged on the circumference in a mode of arrangement in which the are uniformly displaced relative to one another. In this way, a good and stable cover of the seams and/or overlaps will always be provided.

In accordance with an additional preferred embodiment of the present method, the protective foil is formed into an inner foil hose and said foil hose is flattened, the superimposed fibrous strips, which are laterally displaced relative to one another, being jointly lead up to the foil hose with the aid of the guide means and jointly put round said foil hose so that the longitudinal edges of one side, which are arranged in steps relative to one another, are joined in precisely fitting connection with the longitudinal edges of the other side, which are arranged in steps relative to one another. This course of action permits the use of an apparatus which takes up particularly little room. The step of actually putting the fibrous strips round the foil hose is carried out by the guide means in the case of this course of action.

In accordance with an additional variant of the present method, the fibrous strip is impregnated with resin prior to being formed into a hose, said resin being preferably applied by means of rollers. Up to now, it has been common practice to unwind the fibrous strips in their hose shape and to impregnate said hose then with resin in a separate process. By means of the suggestion according to the present invention, the resin-impregnation process can essentially be simplified and carried out at an earlier stage. Impregnating a lining hose, which is comparatively thick in comparison with the individual fibrous strips, with resin is much more difficult and time-consuming than impregnating a single fibrous strip. In addition, the known technique is unable to guarantee that a uniform and complete impregnation with resin has taken place.

It turned out to be particularly advantageous when air is blown into the inner foil hose so that the fibrous strip is wound onto the inflated part of the foil hose. This will prevent the hose from getting inadvertently jammed on the winding mandrel.

In addition, the ready-wound lining hose can be removed by a removing device and wound up. In accordance with the respective winding speed along the winding mandrel, this removing process can be of such a nature that, in principle, infinitely long pieces of hose can be produced continuously. In this connection, it is also possible that the removing device immediately transfers the ready-wound lining hose so that it can be processed in a damaged waste pipe.

For manufacturing reasons, a woven glass roving fabric, a glass-fibre woven fabric and/or a glass-fibre knitted fabric and/or glass-fibre mats and/or non-woven glass-fibre fabrics, alone or in combination with one another, proved to be particularly useful as a fibrous strip. Especially in connection with the resins, which are used in the lining hoses, an extremely high strength is achieved by this combination of materials.

Furthermore, in particular in connection with light-curable resins, it will be advantageous when the outer side of the hose has applied thereto an inwardly and/or outwardly essentially fully light-reflecting layer. An outer non-transparent layer prevents premature curing of the light-curable resin, and this has the effect that the hose can be stored for a longer period of time and that complicated cover means can be dispensed with at the place of production and at the place of processing. An inwardly reflecting layer reduces the curing period of the resin by means of the higher light intensity which can be achieved in this way.

Protection is additionally claimed for a first embodiment of an apparatus for carrying out the method.

This apparatus comprises an elongate winding mandrel and at least two reception means, which are arranged in spaced relationship with the axis of the winding mandrel such that they are adapted to be rotated about said axis and which are used for receiving thereon fibrous-strip and foil-strip rolls, said reception means being arranged such that they are axially displaced with respect to one another relative to the axis of the winding mandrel, and said fibrous-strip and foil-strip rolls being adapted to be rotated about their longitudinal axis and supported in the respective reception means in such a way that the fibrous strip and the foil strip, respectively, is/are adapted to be wound onto the winding mandrel and about the winding mandrel axis, respectively, by a rotary movement of the reception means about the winding mandrel axis and by simultaneous rotation of the fibrous-strip and foil-strip rolls about their own axis, and a removing device removing the wound lining hose from the winding mandrel essentially in the axial direction of said winding mandrel. On the basis of this structural design, which takes up comparatively little room, a lining hose of arbitrary length and strength can be produced. In addition, this type of apparatus can be operated at a comparatively high speed, and, consequently, also hoses of great length can be produced within profitable periods of time.

It will be advantageous when the reception means are each provided with an angularly adjustable reception axle for rotatably receiving thereon the fibrous-strip and foil-strip rolls, the winding lead of the fibrous strip and of the foil strip depending essentially on the angular position of the respective reception axle. This structural design also has the advantageous effect that the lateral edges of the strips are superimposed neatly.

It will also be advantageous when the reception means are each provided with a hooplike frame, which is arranged such that it extends around the winding mandrel and which is supported such that it is adapted to be rotated about said winding mandrel, said frames being adapted to be driven by a drive unit at different speeds in such a way that, in the case of different winding leads of the fibrous strips and foil strips, the unwinding speed in the axial direction of the winding mandrel is the same for all fibrous and foil strips.

In accordance with an additional advantageous embodiment, the winding mandrel is provided with a blow nozzle, which is arranged at the removing end thereof and through which air can be blown into the foil hose. The removal of the foil hose from the winding mandrel is essentially facilitated by said air. In addition, the air can also be used as a driving force for discharging the foil hose.

Another preferred embodiment is an embodiment in which the removing device comprises removing rollers which squeeze the lining hose together, said foil hose having an area filled with air which is located between the removing rollers and the blow nozzle. In addition, the reception means for the foil-strip roll for winding the foil hose can be arranged round the winding mandrel and the reception means for the fibrous-strip roll and for the foil-strip roll for winding an outer foil hose can be arranged essentially around the blow nozzle and/or the air-filled area of the inner foil hose. Due to the fact that the fibrous strip and the outer foil hose are wound onto an air cushion, the sequence of method steps is insusceptible to disturbances to a very large extent, since the hose, which becomes increasingly thicker, cannot get jammed on the winding mandrel.

It will also be advantageous when the reception means for the foil strip each have associated therewith a sealing means for sealing, preferably by welding or by means of an adhesive, the overlapping lateral edges of the foil strip.

In accordance with an advantageous embodiment, the winding mandrel can consist of at least two winding fingers, which are arranged essentially parallel to each other and which are adapted to be adjusted individually or jointly in a direction radial to the axis of the winding mandrel so as to vary the winding circumference of said winding mandrel. By means of this embodiment, the respective hose diameters desired can be produced in a continuously variable manner. In this connection, each of the winding fingers preferably has a cylindrical structural design.

When the winding fingers are supported and/or driven such that they are adapted to be jointly rotated about the axis of the winding mandrel, the winding operation can also be carried out by a rotary movement of the winding mandrel. In this connection, it will also be advantageous when each of the winding fingers is supported and/or driven such that it is adapted to be rotated about its respective axis.

In order to permit the hose to be drawn-off the winding mandrel in the axial direction in a comparatively frictionless manner and without any displacement of the individual wound layers relative to one another, a further embodiment shows the features that the winding fingers are provided with a means, e.g. a belt drive, for producing an advance movement in the longitudinal direction of the hose so that the above-mentioned essentially frictionless removal of the inner foil hose from the winding fingers can take place, said advance movement being synchronous with the hose removal speed.

In the following, protection is claimed for a second embodiment of an apparatus for carrying out the method.

This apparatus shows the features that at least two reception means for rotatably receiving thereon fibrous-strip and foil-strip rolls are arranged in a reception plane extending essentially at right angles to the hose axis, a plurality of reception planes with reception means being provided such that they are displaced relative to one another in the axial direction of the hose axis and the reception means of one reception plane being arranged such that they are rotatably displaced about the hose axis at least relative to the reception means of another plane so that, when seen in the direction of the hose axis, an essentially star-shaped arrangement of the reception means is formed. By applying the fibrous strips in different planes, it is possible to arrange in one plane an essentially arbitrary number of foil-strip rolls for producing the total circumference of the respective hose layer. The narrower the fibrous strips are, the less guide work will have to be carried out by the guide means. In this connection, it should, however, be considered carefully which number of seams and/or overlaps is the most advantageous one. When this apparatus is used, the thickness of the lining hose will be determined by the number of reception planes and the thickness of the fibrous strips. In contrast to the prior art where in connection with most apparatuses the winding lead and the winding speed strongly influence the production speed of the lining hose, the production speed for the lining hose produced by means of the present and other apparatuses for carrying out the method according to the present invention only depends on the speed with which the fibrous strips and the foil strips, respectively, are unwound from the reception means.

In accordance with a preferred embodiment, each fibrous strip has associated therewith a guide means in the form of at least one pressure roller which is provided for bringing the fibrous strip into precisely fitting contact with the inner foil hose. By providing pressure rollers for each fibrous strip, a high geometrical accuracy of the finished lining hose is achieved.

Furthermore, protection is claimed for a third apparatus for carrying out the method.

This apparatus comprises a plurality of reception means, which are used for rotatably receiving thereon fibrous-strip and foil-strip rolls and which are arranged one after the other in a row such that they are laterally displaced relative to one another so that at least the fibrous strips are unwound one on top of the other such that their longitudinal edges are displaced in steps, a guide means being provided, preferably in the form of a plurality of pressure rollers, by means of which the fibrous strips are put around the foil hose. The structural design of this apparatus is even more compact, since the reception means are only arranged one after the other, but not around the whole circumference of the foil hose. Also in this apparatus, the production speed of the lining hose is determined by the speed with which the individual foil strips or fibrous strips are unwound. In the case of this apparatus, the guide means must be considered to be more important, since, in the final analysis, said guide means are responsible for guiding the stepped stack of fibrous strips round the foil hose.

In accordance with a special embodiment of the apparatus described hereinbefore, a pair of rollers can be provided, which is used for applying pressure to upper and lower foil strips and through which the hose is guided, the flat width of the foil hose being narrower than the width of the foil strips so that the laterally projecting edges of the foil strips can be interconnected, preferably by welding or by means of an adhesive, with the aid of a connecting means associated with said pair of rollers. By interconnecting the edges of two foil strips by welding, an inner and/or an outer foil hose of adequate size can be produced in a very elegant and simple manner. In addition, a flat guide tongue can be provided in accordance with a preferred embodiment of the apparatuses, the circumferential length of said flat guide tongue corresponding essentially to the width of the inner foil strip so that said foil strip can be guided round said guide tongue with the aid of guide means, preferably guide means in the form of pressure rollers, so that the foil edges abut on each other in an essentially precisely fitting contact and can be interconnected, preferably by welding or by means of an adhesive, with the aid of a connecting means. A guide tongue of this type guarantees that a lining hose having precisely the shape and the size desired will be produced also in cases in which the inner foil hose is not inflated.

Another embodiment which proved to be advantageous is an embodiment in which the guide tongue is provided with a means for producing an advance movement in the longitudinal direction of the hose so that an essentially frictionless removal of the inner foil hose from said guide tongue can take place, said advance movement being essentially synchronous with the hose removal speed.

In order to permit a particularly economy-priced and simple connection method, an additional embodiment of said apparatus can include an axle which has rotatably attached thereto a roll of adhesive tape as a connection means, the adhesive tape being unwound such that the associated edges of the foil strip are adapted to be pressed with the aid of the guide means onto the sticky side of the adhesive tape in essentially precisely fitting contact with each other.

In addition, protection is claimed for a lining hose, in particular for use in sewer reconstruction work, said lining hose being produced in accordance with a method. The lining hose consists of a foil hose produced by helically winding a foil strip and of at least one resin-impreganted fibrous strip wound onto said foil hose, the lateral edges of the foil strip, which face each other, being arranged such that they overlap and the lateral edges of the fibrous strip, which are associated with each other, being arranged such that they overlap. At this point, it should be mentioned again that, independently of the respective embodiment and the production method, the lining hose can be expanded and cured also without having been brought into contact with a waste pipe; in this case, said lining hose can then be used as a substitute for a piping, e.g. a water pipe, a pipeline or a waste pipe.

A lining hose of this type has the advantages which have already been described hereinbefore.

In accordance with a preferred embodiment, a foil hose, which is produced from a second foil strip, is arranged on the fibrous strips formed into a hose. In this respect, it will be advantageous when the respective longitudinal edges of the inner and/or outer foil strip(s) are sealingly interconnected, preferably by welding or by means of an adhesive.

In accordance with a preferred embodiment, the fibrous strip is helically wound around the foil hose such that a hose shape is obtained. In addition, the fibrous strip can have a winding lead opposite to the winding lead of the first and/or second foil strip(s). It is also possible to wind at least two fibrous strips crosswise.

According to an additional preferred embodiment, the lining hose consists of a plurality of resin-impregnated fibrous strips which are arranged on an inner foil hose such that their longitudinal edges extend essentially in the longitudinal direction of the hose, the seams and/or overlaps of two longitudinal edges of a fibrous strip or of two fibrous strips being covered by a superimposed fibrous strip. Longitudinal seams and/or overlaps of the type occurring in the lining hoses according to the present invention appear, at first sight, less stable to the person skilled in the art than wound lining hoses. By covering the seams and/or overlaps by a respective fibrous strip arranged on top of said seams and/or overlaps, a stability is, however, obtained which definitely comes up to that of wound embodiments. It will also be advantageous when the fibrous strips are arranged such that they are displaced relative to one another in such a way that the seams and/or the overlaps of the longitudinal edges are arranged in a mode of arrangement in which they are uniformly displaced relative to one another over the whole circumference. The stability will be increased once more in this way, since an accumulation of seams and/or overlaps in one area of the lining hose will be avoided.

The fibrous strip preferably consists of a woven glass roving fabric, a glass-fibre woven fabric and/or a glass-fibre knitted fabric and/or glass-fibre mats and/or non-woven glass-fibre fabrics, alone or in combination with one another. These material have the strength required for lining hoses.

Particularly simple curing of the lining hose can be effected by impregnating the fibrous strip with a UV-curable resin, said UV-curable resin being preferably adapted to be cured in the visible and harmless UV-A region with and without additional radical initiators.

In accordance with a further embodiment, the outer side of the hose can have applied thereto an inwardly and/or outwardly essentially fully light-reflecting layer. This will provide the advantages which have already been described hereinbefore with regard to storage, with regard to light shielding during production and processing as well as with regard to curing. The light-reflecting layer is preferably defined by an aluminum layer, said aluminum layer providing a very good efficiency and entailing only little expense. The use of an aluminum foil is imaginable in this connection. According to a preferred embodiment, the light-reflecting layer is defined by an outer foil, preferably a plastic foil, having aluminum applied thereto by vapour deposition. Also the outer foil hose can be used for this purpose. As far as the inventive concept is concerned, it is of secondary importance whether the vapour deposition of aluminum is carried out on the outer side or on the inner side of the foil.

In accordance with a further embodiment, the outer and/or inner foil can be provided with a reinforcing layer, e.g. a layer of woven fabric, so as to prevent the foil from tearing even if long pieces of hose are produced.

At this point, reference should be made to the fact that the lining hose described in the present connection is normally an initial product, which is adapted to be introduced in a sewer section, e.g. by subsequent pulling in, where it can then be cured.

Furthermore, protection is separately claimed for an additional embodiment of the present method. This method is to be regarded as a separate invention with or without combination with one of the residual claims. The method serves to produce a tubular lining hose, in particular for use in sewer reconstruction work, comprising the steps of forming at least one fibrous strip into a curable, resin-impreganted hose, the inner side of the resultant lining hose being provided with a protective foil. The method is characterized in that the fibrous strip is wound onto a winding mandrel consisting of a stabilized foil hose forming the protective foil. By means of such a stabilized foil hose, the costs for the apparatus can essentially be reduced by the method described in the present connection, since the foil hose itself defines the winding mandrel. An embodiment which should especially be emphasized in this connection is the embodiment according to which the foil hose is inflated and the fibrous strip is wound onto the inflated foil hose. This method is important especially insofar as also non-wound foil hoses can be used as an inflated winding core.

In this connection, it will be advantageous when the inflated foil hose is guided essentially eccentrically on a counterholder which is arranged in the interior of said foil hose. This will have the effect that the fibrous strip will neatly abut on the respective point supported by the counter holder.

It will be advantageous when the foil hose is produced from at least one foil strip, which is unwound from a roll in the longitudinal direction of the hose and which is simultaneously formed into a tube, the longitudinal edges of the foil strip or of the foil strips being interconnected by welding or by means of an adhesive. This has the advantage that, on the one hand, the welding seam can be produced in the usual way and that, on the other hand, the hose diameters can be varied in a simple manner by cutting the foil-strip roll to size on a reel cutter such that the manufacturing width is obtained. When two foil strips are used, it will suffice to place them one on top of the other and to interconnect them at the edges thereof for forming the foil hose.

In the following, embodiments of the present invention will be explained in detail on the basis of a drawing, in which.

Figure 1:
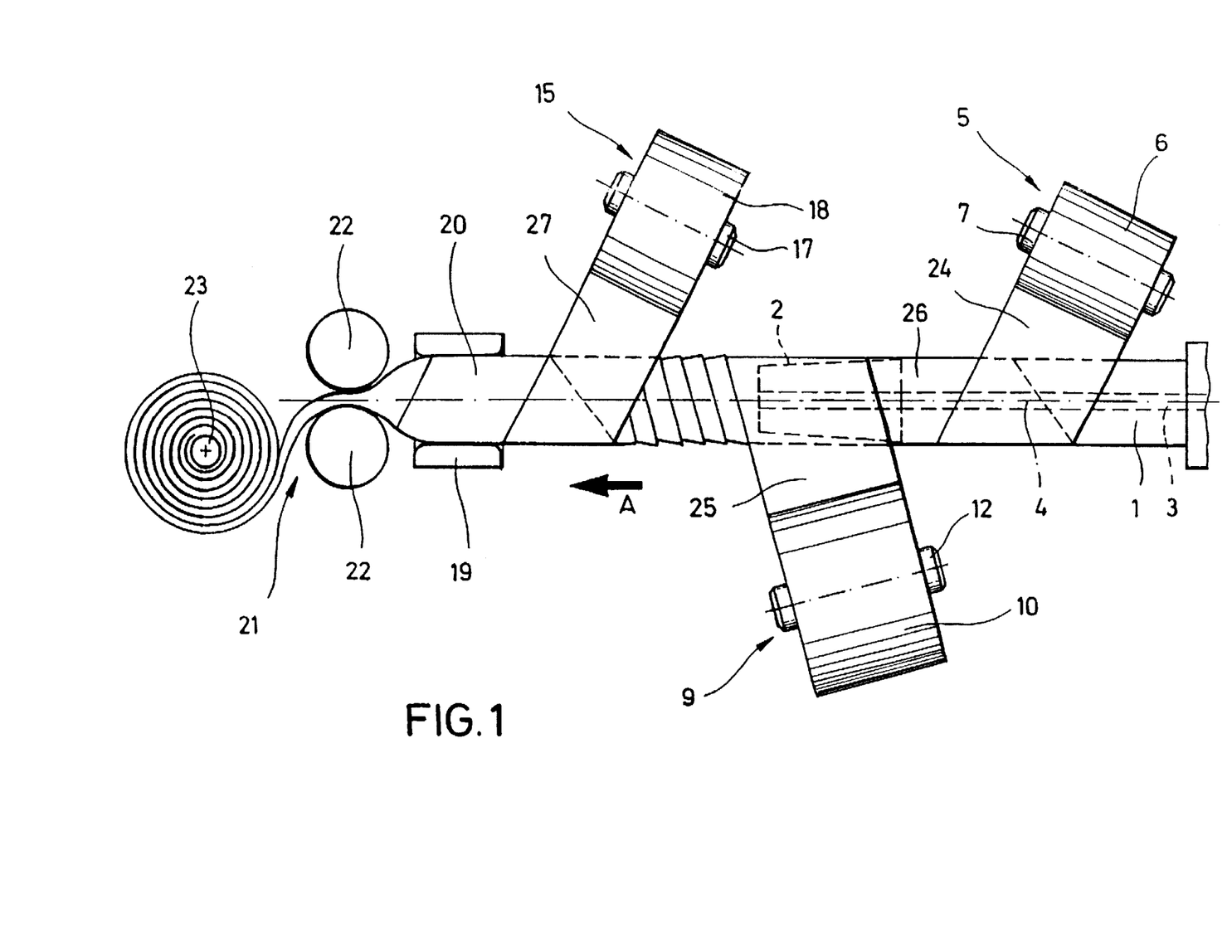
FIG. 1 shows, in a side view, a schematic representation of an apparatus for carrying out the method according to the present invention.

FIG. 1 shows an embodiment of a winding apparatus for carrying out the method according to the present invention. The winding apparatus comprises an elongate, essentially cylindrical winding mandrel 1 having an essentially frusto-conical blow nozzle 2 at one end thereof. The blow nozzle 2 is provided with a supply air conduit 3, which extends through the winding mandrel 1 and which is connected to a compressed-air supply unit at the end facing away from the blow nozzle 2, said compressed-air supply unit being not shown.

A schematically shown first reception means 5 used for receiving thereon a first foil-strip roll 6 is arranged in spaced relationship with the winding mandrel 1 such that it is adapted to be rotated about the axis 4 of said winding mandrel 1. Said first reception means 5 comprises an angularly adjustable reception axle 7 and a hooplike frame 8 (cf. FIG. 2), which is arranged such that it is rotatable about the winding mandrel 1. The frame 8 is adapted to be rotated about the axis 4 of the winding mandrel 1 by a drive unit which is not shown. In this case, also the reception axle 7 rotates about said axis 4 of the winding mandrel 1.

In the area of the blow nozzle 2, a second reception means 9 used for receiving thereon a fibrous-strip roll 10 is arranged such that it is adapted to be rotated about the axis 4 of said winding mandrel 1. Said second reception means 9 also comprises a hooplike frame 11, which is arranged such that it is rotatable about the winding mandrel 1 and which has arranged thereon an angularly adjustable reception axle 12 on which the fibrous-strip roll 10 is rotatably supported.

Figure 2:
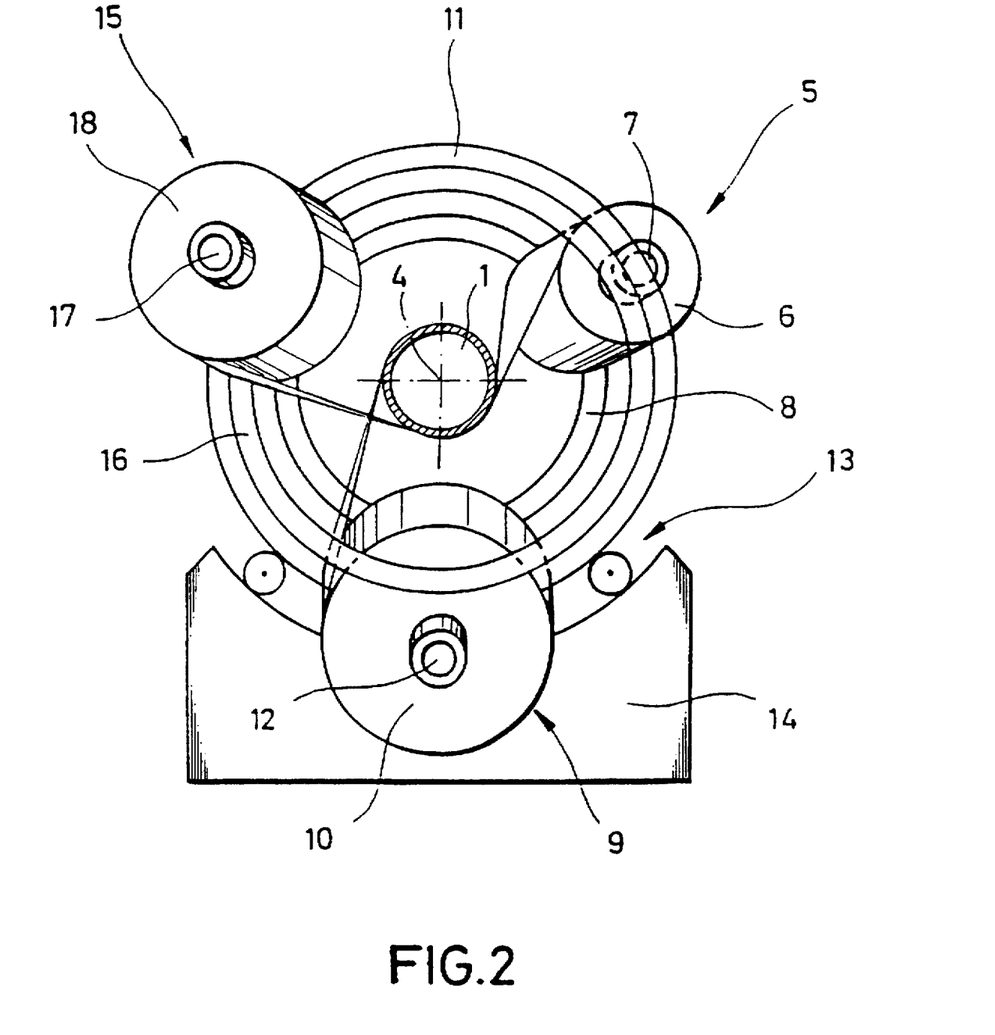
FIG. 2 shows a schematic side view of an apparatus for carrying out the method according to the present invention.

FIG. 2 shows a schematic representation of a drive mechanism 13, which is arranged on a base 14. The drive mechanism 13 drives the frame 11 by means of frictional engagement with the outer circumference thereof.

A third reception means 15 is arranged before the blow nozzle 2 of the winding mandrel 1 when seen in the axial direction, said third reception means 15 being arranged such that it is adapted to be rotated about the axis 4 of said winding mandrel 1. Also the third reception means 15 comprises a hooplike frame 16, which is supported such that it is adapted to be rotated about the axis 4 of the winding mandrel 1 and which has attached thereto an angularly adjustable reception axle 17 on which a second foil-strip roll 18 is rotatably supported.

The third reception means 15 is arranged between the blow nozzle 2 and a guide ring 19 arranged in the axial direction of the axis 4 of the winding mandrel 1. The inner diameter of the guide ring 19 corresponds approximately to the outer diameter of a ready-wound lining hose 20 on the side of the guide ring 19 which faces away from the winding mandrel 1, a removing device 21 is arranged, said removing device 21 comprising a pair of removing rollers 22, which squeeze the lining hose 20 together, as well as a winder 23 for winding up the lining hose 20, which has been squeezed flat by the removing rollers 22.

In the following, one variant of the method according to the present invention will be explained in detail on the basis of the drawings.

A first foil strip 24 is taken from the foil-strip roll 6 and attached to the winding mandrel 1, whereupon it is helically wound onto said winding mandrel 1 by rotary movements of the first reception means 5. A foil strip having a certain length must first be supplied in order to permit an advance movement by means of the removing device 21 and the supply of compressed air from the blow nozzle 2. It will be advantageous to sealingly interconnect the overlapping lateral edges of the foil strip 24. According to a preferred embodiment, this connection can be provided by interconnecting the edges of the foil by means of an adhesive or by welding. For the sake of clarity, the figures do not show any device for interconnecting the overlapping lateral edges. The reception axle 7, about which the first foil-strip roll 6 is adapted to be rotated, is arranged on the frame 8 such that it is angularly adjustable. The desired lead and the overlapping width of the lateral edges of the first foil strip 24 can be determined in this way. Due to the fact that the removing rollers 22 squeeze the foil hose 26 together, compressed air can be pumped into said foil hose through the blow nozzle 2. This will have the effect that the foil hose 26 swells, and, consequently, it can be handled and removed from the winding mandrel 1 more easily.

In the area of the blow nozzle 2, a fibrous strip 25, which is impregnated with resin, is now helically wound onto the inner foil hose 26 with the aid of the second reception means 9. In the course of this operation, the frame 11 rotates about the axis 4 of the winding mandrel 1, whereby the fibrous-strip roll 10 unwinds about the reception axle 12. As can especially be seen in FIG. 1, the fibrous strip 25 is wound such that the lead obtained is opposite to the lead of the first foil strip 24. The possibility of an occurrence of leaky points is thus excluded to a very large extent. In addition, the fibrous strip 25 is wound such that the lead obtained is smaller than that of the first foil strip 24. The lead of the fibrous strip 25 essentially depends on the desired wall thickness, and, consequently, on the strength of the lining hose 20. In order to permit an advance movement in direction A at a constant speed, the fibrous strip 25 must be wound faster around the axis 4 of the winding mandrel 1 than the first foil strip 24 in the case shown in FIG. 1. In order to achieve this, the frame 11 of the second reception means 9 rotates at a speed which is coordinated in an adequate manner with the speed of frame 8. For this purpose, the reception means 5 and 9 can be driven separately or in common by means of a coupling and transmission mechanism. This mechanism should, however, work continuously, since also the angular positions of the reception axles 7 and 12 are steplessly adjustable. It proved to be particularly advantageous when the fibrous strip 25 is wound in the area of the inflated foil hose 26, as can be seen in FIG. 1. The inflated hose 26 serves so to speak as a central core. The fibrous strip 25 can have been impregnated with resin previously in a separate system. It is, however, also possible to associate with the second reception means 9 an application unit, which is not shown, said application unit comprising application rollers whose contact pressure is adjustable so as to vary the resin content. This has the advantage that only the amount of fibrous strip 25 required for processing is impregnated with resin.

Subsequently, a second foil strip 27 is wound onto the wound, resin-impregnated fibrous strip 25; the direction of the lead of said second foil strip 27 is again opposite to that of the lead of the fibrous strip 25. In addition, the lead of the second foil strip 27 is larger than that of the fibrous strip 25, and, consequently, the third reception means 15 rotates at a speed which is lower than that of the second reception means 9 and in a direction of rotation opposite to the direction of rotation of said second reception means 9. Also in this case, the overlapping lateral edges of the foil strip 27 can sealingly be interconnected in a further step by means of a device which is not shown. The outer surface of the then ready-wound lining hose 20, whose inner foil hose 26 is still inflated, is now passed through the guide ring 19. This will have the effect that the lining hose 20 will be wound around the axis 4 of the winding mandrel 1 essentially also in the non-supported area between the guide ring 19 and the winding mandrel 1. The method especially offers the advantage that the individual winding operations of the fibrous strip 25 and of the foil strips 24, 27 can be carried out simultaneously.

Subsequently, the finished lining hose 20 is seized by the removing rollers 22 and squeezed together. In this way, the lining hose 20 can be wound onto a winder 23 in the manner known, for future processing. It would also be imaginable to directly introduce the lining hose 20, which has been produced in the manner described hereinbefore, into the sewer to be reconstructed.

The lining hose 20, which has been produced in this way, can then be introduced in the manner known into a sewer to be reconstructed and, subsequently, it can be given its final shape by means of compressed air or water pressure. The outer foil hose, which has been produced by means of the second foil strip 27, will then abut on the inner wall of the sewer. Subsequently, the resin-impregnated fibrous strip will be cured in accordance with the conditions of the resin used. Especially well-known resins in this connection are UV-curable resins in the case of which UV light-emitting radiators are introduced in the interior of the lining hose 20. A material for the fibrous strip 25 which turned out to be particularly stable is a woven glass roving fabric. The outer surface of the hose can additionally have applied thereto a light-reflecting layer, e.g. in the form of a plastic foil having a layer of aluminum applied thereto by vapour deposition. The plastic foil can also be used as the foil for the outer foil hose.

A lining hose 20 produced in accordance with the method according to the present invention can be produced in situ such that it has the desired thickness and the desired length and, subsequently, it can be processed without delay. In particular the preliminary production of an inner foil hose, which must be prepared for the winding operation by strenuous work, can be dispensed with when the method according to the present invention is used.

In connection with the present invention, it should additionally be mentioned that, instead of rotating the foil-strip rolls 6 and 18 as well as the fibrous-strip roll 10 about the axis 4 of the winding mandrel 1, it would also be imaginable to rotate the winding mandrel and the foil hose, respectively, and this would permit the reception means 5, 9 and 15 to stand still. If, in the case of such a method, oppositely directed winding leads are desired, the individual strips 24, 25 and 27 must be lead up to the winding mandrel 1 and the inner foil hose 26, respectively, in an adequate manner. The routing shown in FIG. 1 would not be suitable for this type of operation.

Figure 3:
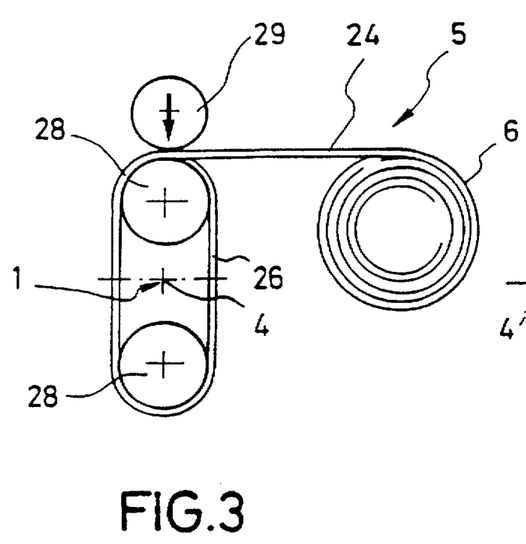
FIG. 3 shows a schematic side view of a second embodiment of an apparatus.
Figure 4:
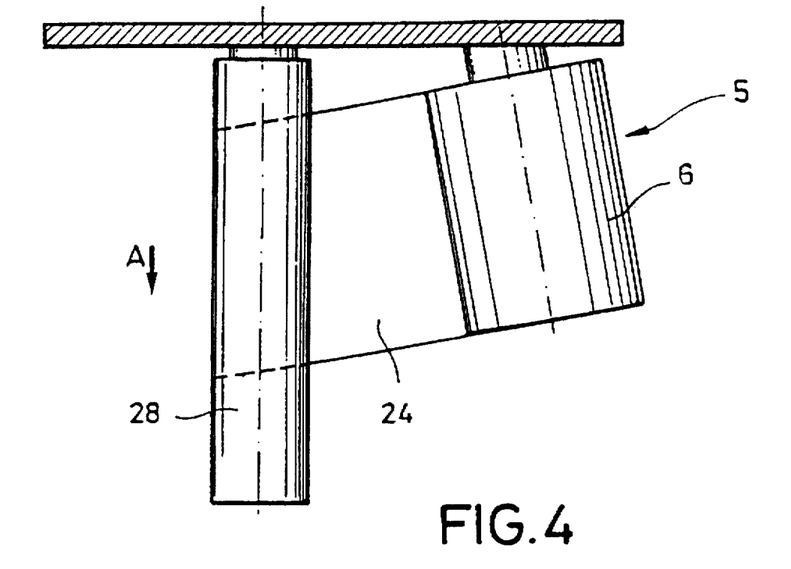
FIG. 4 shows a top view of the embodiment according to FIG. 3.
Figure 5:
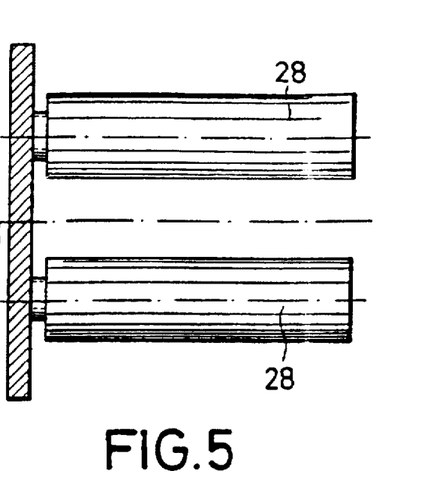
FIG. 5 shows a winding mandrel formed by a first variant of winding fingers.
Figure 6:
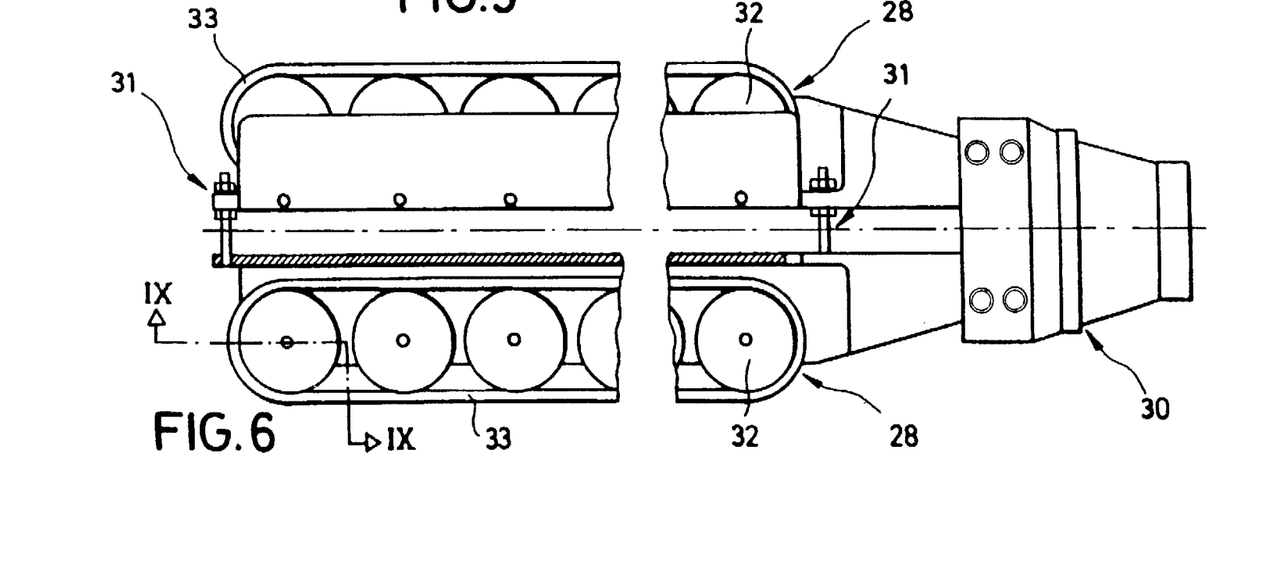
FIG. 6 shows a second variant of winding fingers in a front view, part of which is a sectional view.
Figures 7, 9:
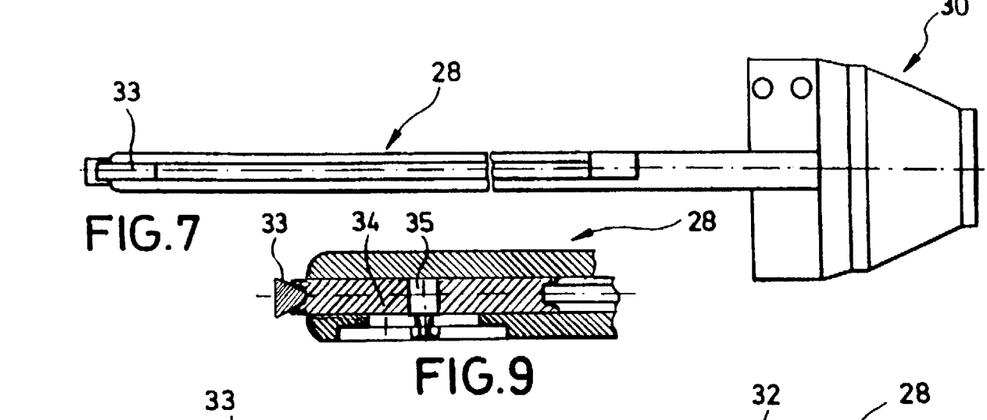
FIG. 7 shows a top view of the winding finger according to FIG. 6.
FIG. 9 shows a sectional fragmentary view of the winding finger according to FIG. 6, cut along the line IX—IX.
Figure 8:
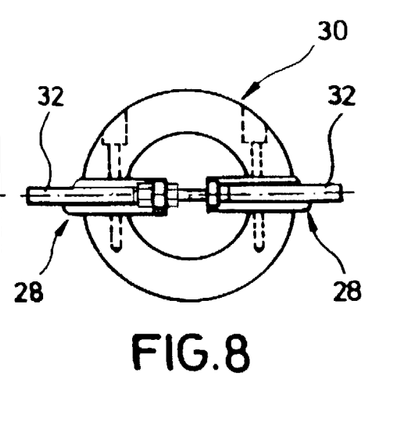
FIG. 8 shows a side view of the winding finger according to FIG. 7.

In the following, a second embodiment of the apparatus for carrying out the method according to the present invention will be discussed on the basis of FIGS. 3 to 5. The same reference numerals will be used for identical and similar components.

In this apparatus, the winding mandrel 1 consists of two cylindrical winding fingers 28, which are arranged in parallel. The winding fingers 28 are also arranged parallel to the axis 4 of the winding mandrel 1 and they are adapted to be displaced radially to said axis 4. In this way, it is possible to enlarge the effective winding circumference of the winding mandrel 1, whereby steplessly different hose diameters can be produced. The winding fingers 28, an arbitrary number of which can be provided, can either rotate about the axis of the winding mandrel, whereby a foil strip 24 is unwound from the foil-strip roll 6 and wound onto the winding mandrel 1. The thus wound foil hose 26 is then discharged in direction A. It is, however, also possible to rotate the individual reception means 5, 9 and 15 about the axis 4 of the winding mandrel 1 while said winding mandrel 1 is standing still. If desired, the winding fingers 28 can also be rotated about their own axis and/or adapted to be driven such that they rotate about their own axis. As is already known from the first embodiment, the foil-strip roll 6 is arranged such that its angle relative to the axis of the winding mandrel can be adjusted. At this point, it should be mentioned that, for the sake of clarity, only the foil-strip roll 6, but no other strip rolls, are shown. The foil strip 24 is seized by a pressure roller 29 and pressed onto one of the winding fingers 28. This has the effect that the foil strip 24 is guided and drawn tight. Subsequently, the fibrous strip 25 and the second foil strip 27 can be wound helically onto the inner foil hose 26 as usual.

In the following, a second variant of the winding fingers 28 is referred to with the aid of FIGS. 6 to 9. The essentially flat winding fingers 28 shown in these figures are arranged on one side thereof on a common reception device 30. The reception device 30 is held by an adequate supporting means, which is not shown. The two winding fingers 28 are oriented essentially parallel to one another, and they are adapted to be adjusted relative to one another by adjustment elements 31, which are shown in the drawing in the form of screws. The ends of the winding fingers 28 secured to the reception device 30 can also be displaced in said reception device 30. The special property of these winding fingers 28 is that they represent a means for providing an advance movement. According to the present variant, this advance movement is effected by pulleys 32, which are integrated in said winding fingers 28 and which have attached thereto, essentially tightly, a belt 33 associated with a winding finger 28. The pulleys 32 of a winding finger 28 are accessible on one side thereof through openings 34 in the side walls of the winding fingers 28 so that their fastening and adjusting bolts 35 can be released and adjusted. The belt 33 used is preferably a V-belt. The pulleys 32 are then provided with an adequate structural design. It is possible to drive the belt via a separate drive means, especially via a drive means operating synchronously with the driving speed of the reception device 30, or to cause essentially frictionless drawing off in the discharge direction A by smooth running of the belt drive. When the feed rate caused by the belt drive of the winding fingers 28 corresponds to the removal rate A, the foil hose 26 will be drawn off the winding fingers 28 in an essentially frictionless and, consequently, wrinkle-free manner. However, even a smooth-running belt arrangement provides an essential advantage with regard to the removal of the foil hose 26 from the winding fingers 28. On the basis of the adjustment possibility provided by the adjustment elements 31, all hose diameters can be produced within the limits predetermined by the dimensions of the winding fingers 28.

In the following, a third embodiment of an apparatus for carrying out the method according to the present invention will be described in detail on the basis of FIGS. 10 and 11.

Figure 10:
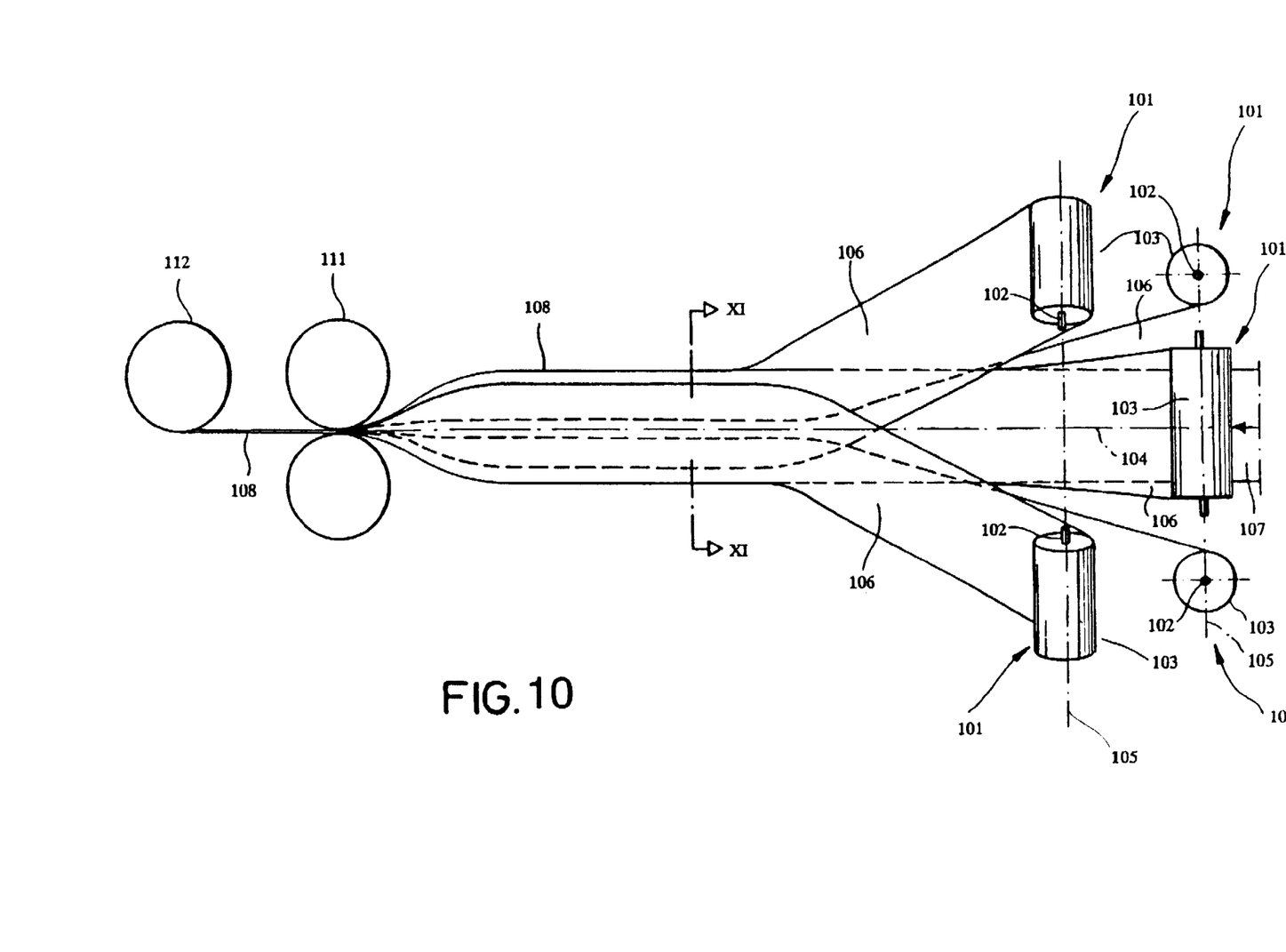
FIG. 10 shows a schematic side view of a third embodiment of an apparatus for carrying out the method according to the present invention.
Figure 11:
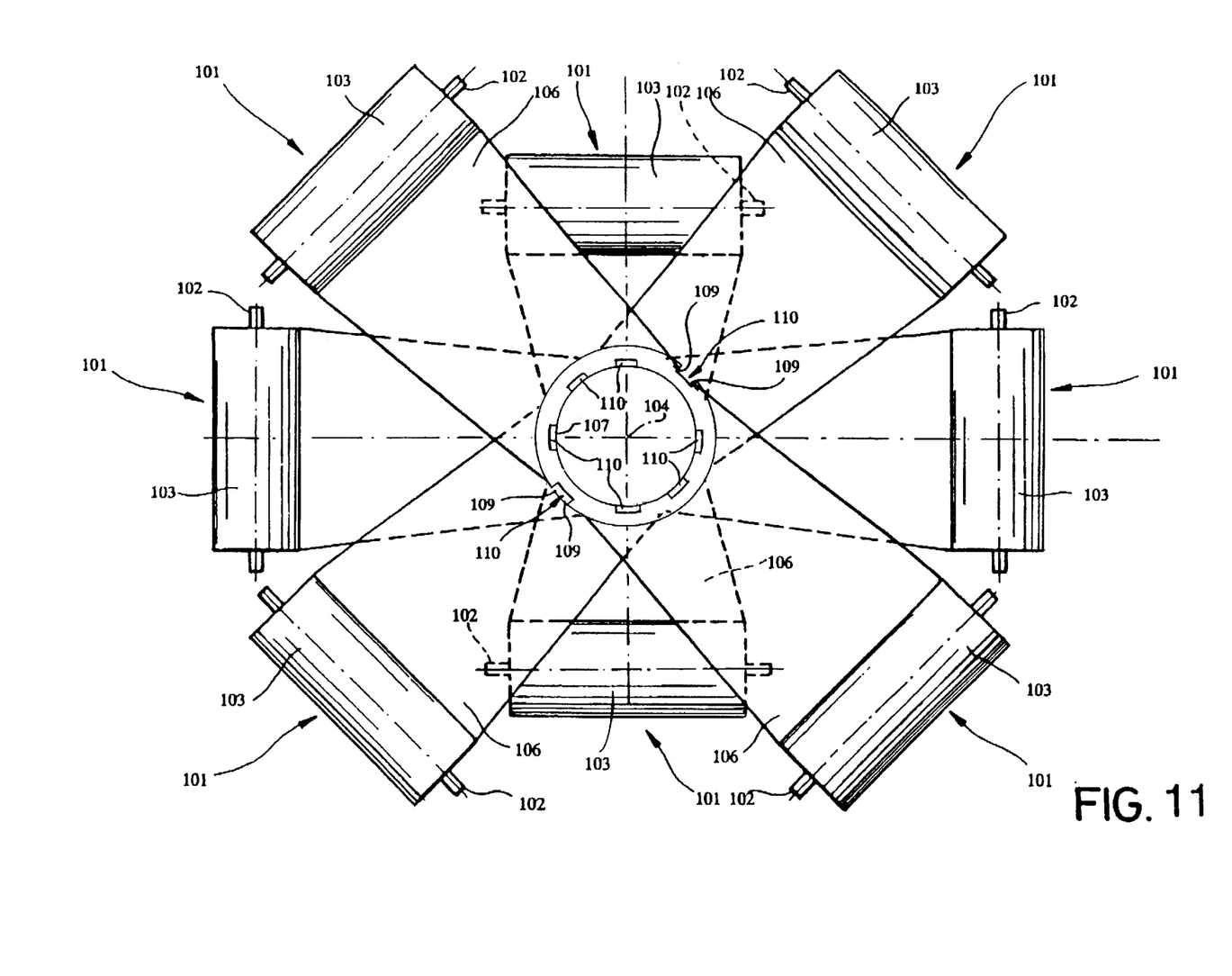
FIG. 11 shows an enlarged side view of FIG. 10 cut along the line XI—XI.

The apparatus shown in FIGS. 10 and 11 comprises a plurality of reception means 101, which are shown schematically and each of which comprises a reception axle 102 for rotatably receiving thereon fibrous-strip rolls 103. Each of said reception means 101 is arranged in a reception plane 105 extending essentially at right angles to the hose axis 104. FIG. 10 shows two reception planes 105 which are arranged such that they are displaced relative to one another in the axial direction of the hose axis 104. As can especially be seen from FIG. 11, the reception means 101 of two reception planes 105 are arranged such that they are rotatably displaced relative to one another about the hose axis 104 so that, when seen in FIG. 11 in the direction of the hose axis 104, a star-shaped arrangement of the reception means 101 is formed.

In addition, the reception means 101 of one or more reception planes 105 can be located at different distances from the hose axis 104. Fibrous strips 106, which are unwound from the fibrous-strip rolls 103, are lead up to a foil hose 107. In the case of this apparatus, the foil hose 107 is expanded by means of compressed air or water such that a cylindrical shape is obtained.

The fibrous strips 106 are impregnated with a resin, which is preferably UV-curable. The fibrous-strip rolls 103 can already be pre-impregnated with resin or the fibrous strips 106 are guided through a special resin-application device upon being unwound, said resin-application device being not shown. The step of leading the fibrous strips 106 up to the foil hose 107 in a star-shaped configuration is carried out by guide means, which are not shown; said guide means being preferably provided in the form of pressure rollers.

As can be seen in FIG. 11, two fibrous strips 106 respectively form a layer of a lining hose 108 to be produced. When arranged on the hose 107, the longitudinal edges 109 associated with one another are located at a distance from one another so that a seam 110 is formed. It would, however, also be imaginable that the longitudinal edges 109 of the fibrous strips 106 are arranged such that they overlap. A subsequent layer will be arranged such that the upper fibrous strips 106 completely cover a seam 110 or an overlap located therebelow. This course of action is maintained throughout the whole process until the last layer has been applied. The last layer can selectively be provided with reinforcement strips, which are positioned on top of seams 110 or overlaps; it is also possible to provide no reinforcing means at all in the last layer because this will not result in any loss of strength which would be worth mentioning.

In FIG. 11, it is also clearly evident that the seams 110 or overlaps of the longitudinal edges 109 are arranged on the circumference of the foil hose 107 such that they are uniformly displaced relative to one another. This will improve the strength properties.

Reception means 101 providing fibrous strips 106 for different layers can be arranged within one reception plane 105. It is, however, also possible to use narrower fibrous strips 106 so that one layer will be composed of more than two fibrous strips 106.

When the lining hose 108 has reached its desired wall thickness by means of an adequate number of layers and fibrous strips 106 having an adequate thickness, an outer foil hose can additionally be applied to the lining hose 108, this being not shown in FIGS. 10 and 11.

Subsequently, the finished lining hose 108 is passed through a pair of rollers 111, which squeeze the lining hose 108 together so that it can be wound up by a removing device 112, said removing device being preferably provided in the form of a winding drum. It is also imaginable to advance the lining hose 108 directly so that further processing can take place.

In the following, a fourth embodiment of an apparatus for carrying out the method according to the present invention will be explained in detail on the basis of FIGS. 12 and 13 only the differences between this apparatus and the preceding one will be discussed hereinbelow. The same reference numerals will still be used for similar or identical components.

In the case of this apparatus, the inner foil hose 107 is supplied to the apparatus in a flat, non-expanded form. Below the foil hose 107, a plurality of reception means 101 are arranged one after the other in a row. The reception axles 102 of said reception means 101 are oriented such that they extend essentially parallel to one another. The reception means 101 are, however, laterally displaced relative to one another so that fibrous-strip rolls 103, which are rotatably supported on said reception axles 102, are unwound such that their longitudinal edges 109 are displaced relative to one another. The fibrous strips 106 are guided such that they are arranged one on top of the other. FIG. 13 shows this in a particularly clear manner. The stepped fibrous strips 106 are then put round the flat, inner foil hose 107 with the aid of guide means 113 in the form of pressure rollers. In the course of this process, the stepped longitudinal edges 109 of one side of the fibrous strips 106 are placed into precisely fitting contact with the stepped longitudinal edges 109 of the other side of the fibrous strips 106. In this connection, it is still guaranteed that the resultant seams 110 and/or overlaps will always be covered by the fibrous strip 106 placed on top.

Figure 14:
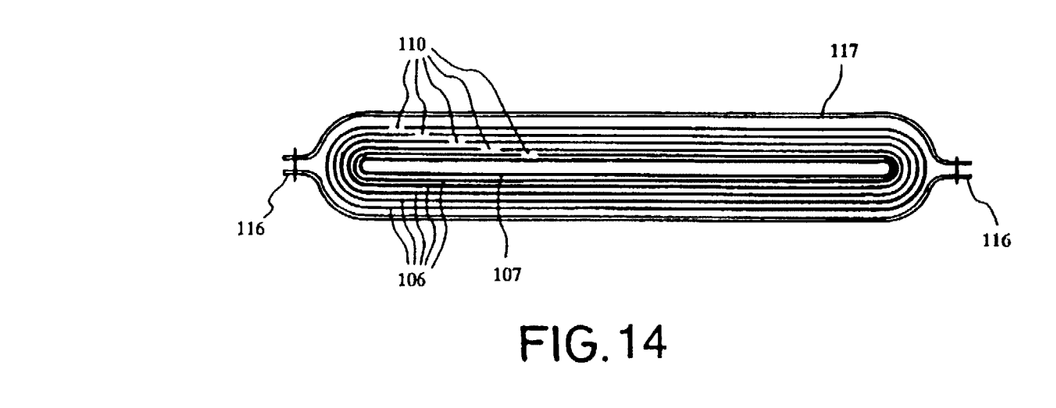
FIG. 14 shows an enlarged cross-sectional representation cut along the line XIV—XIV of FIG. 12.

Subsequently, the foil hose 107 and the fibrous strips 106 are guided through a pair of rollers 111, which presses upper and lower foil strips 114 simultaneously against the lining hose. The upper and the lower foil strip 114 are each unwound from a foil-strip roll 115. As can be seen in FIG. 14, the width of the flat lining hose 108 is preferably narrower than the width of the foil strips 114 so that the laterally projecting edges 116 of the foil strips are interconnected, preferably by welding or by means of an adhesive, with the aid of a connecting means associated with said pair of rollers, said connecting means being not shown in the figures.

The complete structural design of the lining hose 108 at this point is clearly shown in FIG. 14. The only additional statement which should be made in this connection is that the steps in the stepped arrangement of the seams 110 can be more distinct than those which can be seen in FIG. 14.

Subsequently, the lining hose 108 is wound up by a removing device 112.

At this point, it should additionally be mentioned that the inner foil hose 107 can also be produced in a manner similar to that in which the outer foil hose 117 according to FIG. 14 is produced.

Figure 12:
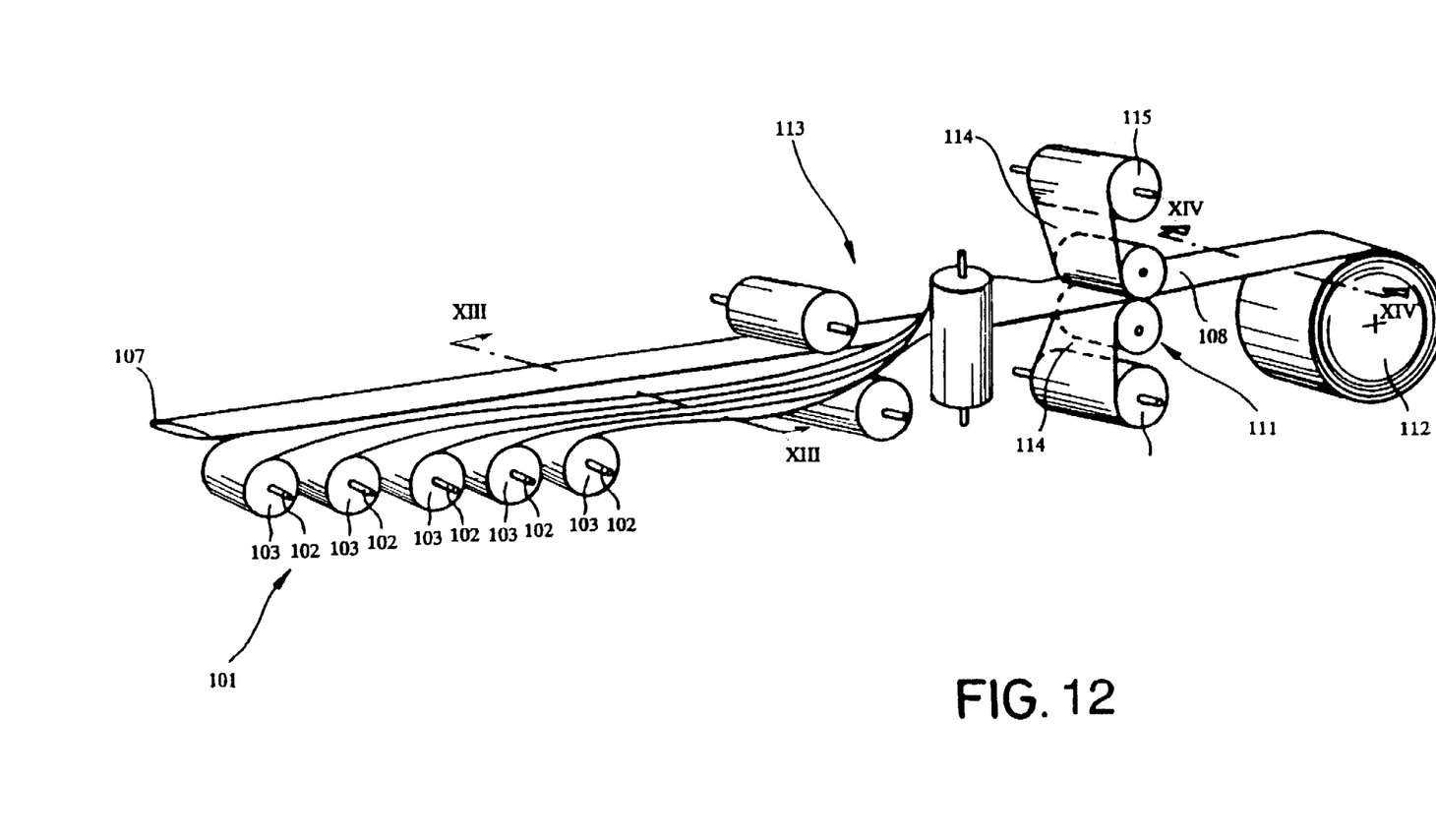
FIG. 12 shows a perspective, schematic representation of a fourth embodiment of an apparatus for carrying out the method according to the present invention.
Figure 13:
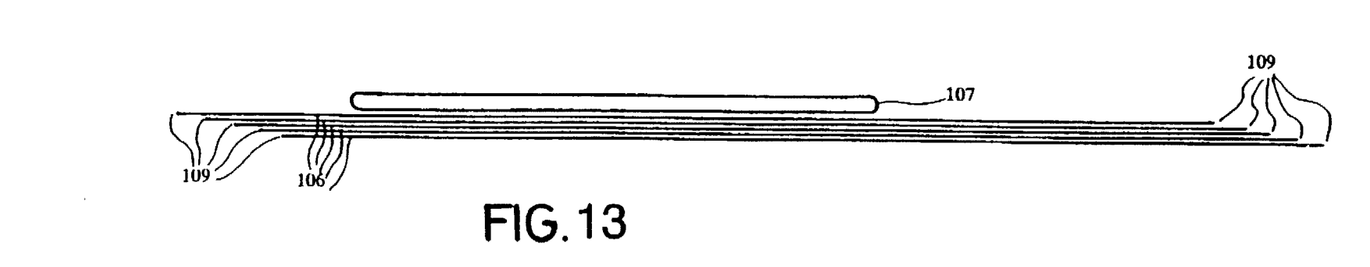
FIG. 13 shows an enlarged cross-sectional representation cut along the line XIII—XIII of FIG. 12.
Figure 15:
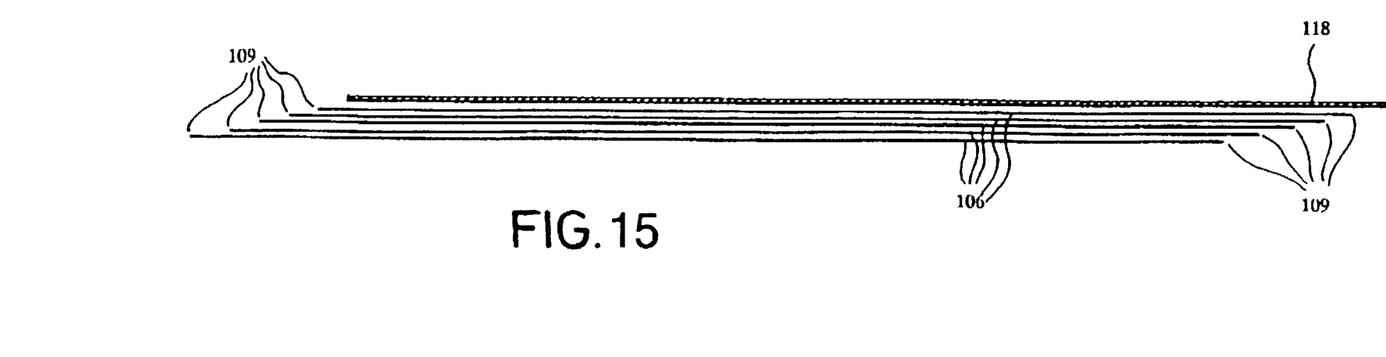
FIG. 15 shows a schematic representation of an additional embodiment of a winding structure according to the present invention.

FIG. 15 shows an additional lamination which can be used in connection with the apparatus according to FIG. 12. For forming an inner foil hose 107, an inner foil strip 118 is, in this case, applied to the fibrous strip in a stepped mode of arrangement so that, when the inner foil strip 118 and the fibrous strips 106 are bent, the inner foil hose 107 will be formed simultaneously.

Figure 16:
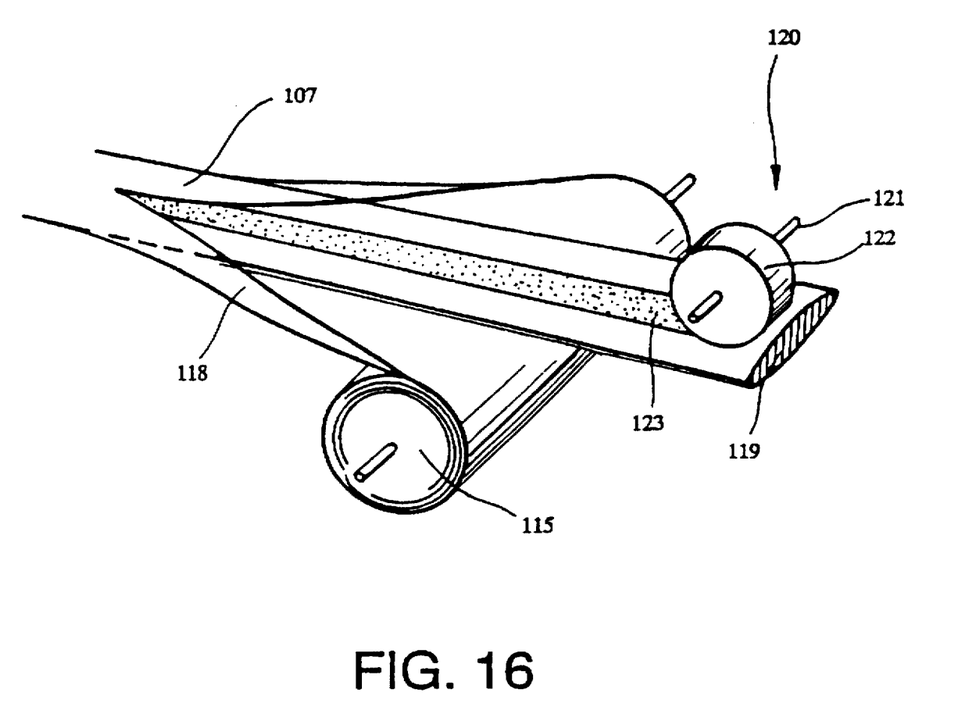
FIG. 16 shows a schematic representation of a foil-hose winding operation according to one embodiment of the present invention.

FIG. 16 shows how such an inner foil strip 118 is unwound from a foil-strip roll 115 and put round a flat guide tongue 119 with the aid of guide means, preferably pressure rollers, which are not shown, the circumferential length of said guide tongue 119 corresponding essentially to the width of the inner foil strip and, consequently, of the desired inner circumference of the lining hose 108. The edges of the foil are placed into an essentially precisely fitting contact with each other so that they can be interconnected by a connecting means 120. The connection can be provided either by welding or by means of an adhesive. In FIG. 16, an axle 121 having rotatably attached thereto a roll of adhesive tape is provided as a connecting means 120. An adhesive tape 123 is unwound onto the guide tongue 119 such that the sticky surface thereof faces upwards and in such a way that the associated edges of the inner foil strip 118 will be pressed with the aid of the guide means onto the sticky side of the adhesive tape 123 in an essentially precisely fitting contact with each other. In this way, an inner foil hose 107 will be produced continuously. An outer foil hose can be produced in a similar manner.

In the case of an embodiment which is not shown, the guide tongue 119 can be provided with a means for producing an advance movement in the longitudinal direction of the hose, said advancement movement being essentially synchronous with the hose removal rate. A structural design can be similar to that of the belt drives used in connection with the winding fingers 28 (cf. in this respect FIGS. 6 to 9).

Reference is especially made to another variant of the present method where the inner foil hose is inflated when the fibrous strip is being wound onto said foil hose. The foil hose can be guided eccentrically round a counterholder arranged in the interior thereof. Also this method permits a production of arbitrary hose diameters on one and the same system. Furthermore, this method also permits the use of all kinds of foil hoses, even foil hoses which are not wound. The further process is chosen in accordance with one of the embodiments described hereinbefore.

The present invention permits the production of a lining hose at a reasonable price, with little expenditure as far as the devices used in the production of said hose are concerned, and at a comparatively high production speed. The fibrous strip consists preferably of a woven glass roving fabric, a glass-fibre woven fabric and/or a glass-fibre knitted fabric and/or glass-fibre mats and/or non-woven glass-fibre fabrics, alone or in combination with one another. The fibrous strip is preferably, but not inevitably, impregnated with a UV-curable resin, which is preferably adapted to be cured in the visible and harmless UV-A region with and without additional radical initiators. These materials proved to be excellent materials for lining hoses. In addition, the outer side of the hose can have applied thereto an inwardly and/or outwardly essentially fully light-reflecting layer.

A lining hose produced in accordance with the methods described hereinbefore can, e.g. for sewer reconstruction work, be introduced in a defective waste pipe, expanded and cured. It is, however, also possible to use said lining hose as a sewer pipe substitute by laying said hose, in the extended and cured condition, directly as a piping, e.g. water pipe, pipeline or waste pipe.

I claim:

1. A method of producing a tubular lining hose (20, 108), comprising the steps of forming at least one fibrous strip (25, 106) into a curable, resin-impregnated hose, an inner side of the resultant lining hose (20, 108) being provided with an inner foil hose (26, 107) onto which the fibrous strip (25, 106) is wound, wherein a winding operation takes place on a winding mandrel (1) consisting of at least two winding fingers (28), which are arranged essentially parallel to each other and a distance of which can be adjusted in a direction radial to an axis (4) of the winding mandrel (1) so as to vary a winding circumference of said winding mandrel (1), and wherein the lining hose (20, 108) is advanced in a longitudinal direction of the hose (20, 108) by a means for substantially frictionless removal of the hose (26, 108) from the winding fingers (28), said advance movement being synchronous with a hose removal speed, and wherein the fibrous strip (25, 106) is unwound from a fibrous-strip roll (6, 10, 18) provided with an annular frame (8, 11, 16), which is arranged so that the fibrous-strip roll rotates about said winding mandrel (1).

2. A method according to claim 1, including an outer foil hose (1, 17) arranged around the fibrous strip (25, 106) and formed into the lining hose.

3. A method according to claim 2, wherein the fibrous strip (25, 106) formed into the hose has applied thereto the outer foil hose by helically winding a second foil strip (27) onto said fibrous strip (25, 106), associated lateral edges of said second foil strip (27) being arranged such that they overlap.

4. The method according to claim 2, wherein the outer foil hose (117) is made from at least one foil strip (14, 18), which is unwound from a foil-strip roll (15) in a longitudinal direction of the hose and simultaneously formed into a hose, the longitudinal edges of the foil strip (14, 18) being interconnected.

5. The method according to claim 2, wherein the edges of the inner and outer foil hose (26, 107, 117) are interconnected by an adhesive tape (123) which is unwound in a same direction.

6. The method according to claim 1, wherein the winding operations of the fibrous strip (25, 106) and of a foil strip (24) are carried out substantially simultaneously.

7. The method according to claim 6, wherein overlapping lateral edges of a foil strip (24, 27, 114, 118) are sealingly interconnected by welding.

8. The method according to claim 6, wherein overlapping lateral edges of a foil strip (24, 27, 114, 118) are sealingly interconnected by an adhesive.

9. The method according to claim 1, wherein at least one fibrous strip (25) is helically wound around the foil hose (26) such that a hose shape is obtained, lateral edges of the fibrous strip (25), which face each other, being overlapped.

10. The method according to claim 9, wherein at least one fibrous strip (25) is wound such that the lead obtained is opposite to a lead of the foil strip (24, 27).

11. The method according to claim 9, wherein at least two fibrous strips (25) are wound crosswise with respect to one another.

12. The method according to claim 1, wherein the fibrous strip (106) is wound onto the hose (107) such that its longitudinal edges (109) are oriented essentially in a longitudinal direction of the hose, said fibrous strip (106) being guided with the aid of guide means (113) positioned around the foil such that a shape of a hose is obtained, and seams (110) of two longitudinal edges (109) of a fibrous strip (106) being covered by a superimposed fibrous strip (106).

13. The method according to claim 12, wherein two fibrous strips (106) are unwound in a condition in which they are displaced relative to one another in such a way that longitudinal edges thereof (109) will be arranged on the circumference in a mode of arrangement in which they are uniformly displaced relative to one another.

14. The method according to claim 12, wherein the protective foil is formed into an inner foil hose (107) and that said foil hose (107) is flattened, wherein superimposed fibrous strips (106), which are laterally displaced relative to one another, being jointly lead up to the foil hose (107) with an aid of the guide means (113) are jointly put round said foil hose (107) so that longitudinal edges (109) of one side, which are arranged in steps relative to one another, are joined in a substantially precisely fitting connection with the longitudinal edges (109) of an other side, which are arranged in steps relative to one another.

15. The method according to claim 1, wherein the fibrous strip (25, 106) is impregnated with resin prior to being formed into a hose.

16. The method according to claim 1, wherein air is blown into the inner foil hose (26, 107) so that the fibrous strip (25, 106) is wound onto the inflated part of the foil hose (26, 107).

17. The method according to claim 1, wherein a ready-wound lining hose (20, 108) is removed by a removing device (21, 112) and wound up.

18. The method according to claim 1, wherein the fibrous strip consists of one of the following classes of materials: a woven glass roving fabric, a glass-fiber woven fabric, a glass-fiber knotted fabric, glass-fiber mats, non-woven glass-fiber fabrics.

19. The method according to claim 1, wherein a side of the hose has applied thereto a substantially fully light-reflecting layer.

20. An apparatus for producing a tubular lining hose (20, 108) comprising:

an elongate winding mandrel (1) and at least two reception means (5, 9, 15) which are arranged in spaced relationship with an axis (4) of the winding mandrel (1) such that they are adapted to be rotated about said axis (4) and which are used for receiving thereon fibrous-strip rolls (6, 10, 18); said fibrous-strip rolls (6, 10, 18) being adapted to be rotated about their longitudinal axis and supported in respective reception means (5, 9, 15) in such a way that the fibrous strips are adapted to be would on the winding mandrel (1) and the winding mandrel axis (4), respectively, by a rotary movement of the reception means about the winding mandrel axis and by simultaneous rotation of the fibrous-strip rolls (6, 10, 18) about their own axis;

a removing device (21) for removing a wound lining hose (20) from the winding mandrel (1) substantially in the axial direction of said winding mandrel, wherein said winding mandrel (1) has at least two winding fingers (28), which are arranged substantially parallel to each other and a distance of which can be adjusted individually or jointly in a direction radial to the axis (4) of the winding mandrel (1) so as to vary a winding circumference of said winding mandrel (1), said winding fingers (28) being provided with a means for producing an advance movement in a longitudinal direction of the hose so that a substantially frictionless removal of an inner foil hose (26) from the winding fingers (28) takes place, said advance movement being synchronous with a hose removal speed; and, said reception means (5, 9, 15) are each provided with a annular frame (8, 11, 16), which is arranged such that it extends around the winding mandrel (1) and which is supported such that it is adapted to be rotated about said winding mandrel (1).

21. The apparatus according to claim 20, wherein said annular frames (8, 11, 16) are adapted to be driven by a drive unit at different speeds in such a way that in a case of different winding leads of the fibrous strips (24, 25, 27), the winding speed in the axial direction of the winding mandrel (1) is substantially identical for all fibrous and foil strips (24, 25, 27).

22. The apparatus according to claim 20, wherein the reception means (5, 9, 15) are each provided with an angularly adjustable reception axle (7, 12, 17) for rotatably receiving thereon the fibrous-strip rolls (6, 10, 18), the angular position of the respective reception axle (7, 12, 17) being adapted to a winding lead of the fibrous strip (24, 25, 27).

23. The apparatus according to claim 20, wherein said means for producing an advance movement is a drive belt.

24. The apparatus according to claim 20, wherein the winding mandrel (1) is provided with a blow nozzle (2), which is arranged at a removing end thereof and through which air can be blown into an inner foil hose (26).

25. The apparatus according to claim 24, wherein the removing device (21) has removing rollers (22) which squeeze the lining hose (20) together, said foil hose (26) having an area filled with air which is located between the removing rollers (22) and the blow nozzle (2).

26. The apparatus according to claim 25, wherein one of the reception means (5) for a first foil-strip roll (24) for winding an inner foil hose (26) is arranged round the winding mandrel (1) and that reception means (9, 15) for the fibrous-strip roll (10) and for a second foil-strip roll (18) for winding an outer foil hose are arranged essentially around the blow nozzle (2) and the air-filled area of the foil hose (26).

27. The apparatus according to claim 26, wherein the reception means (5, 15) for the foil strip (24, 27) each have associated therewith a sealing means for sealing overlapping lateral edges of the foil strip (24, 27).

28. The apparatus of claim 27 wherein the sealing means is a welding device.

29. The apparatus of claim 27 wherein the sealing means is a by an adhesive means.

* * * * *